May 11, 1965   R. S. FLEMING ETAL   3,182,404
BOWLING BALL GRIP MEASURING DEVICE
Filed Jan. 2, 1962
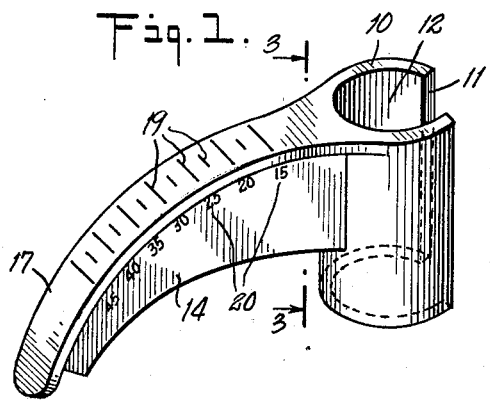
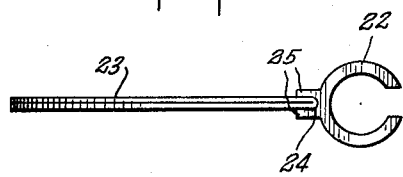
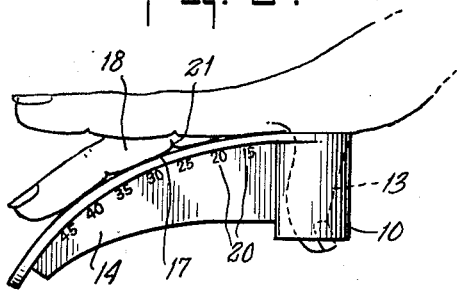
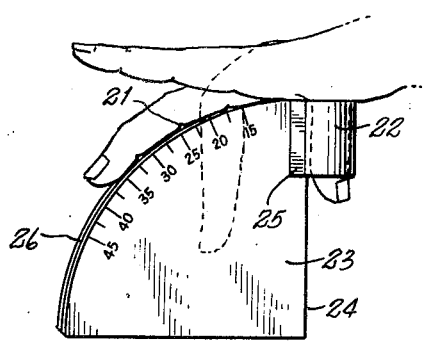
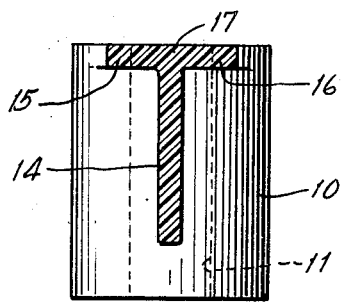
INVENTORS
ROBERT S. FLEMING
BY EDWARD G. NEIBLING
Paul M. Phillips
ATTORNEY

United States Patent Office 3,182,404
Patented May 11, 1965

3,182,404
BOWLING BALL GRIP MEASURING DEVICE
Robert S. Fleming, Pompton Plains, and Edward G. Neibling, Franklin Lakes, N.J., assignors to Amerace Corporation, New York, N.Y., a corporation of Delaware
Filed Jan. 2, 1962, Ser. No. 163,624
7 Claims. (Cl. 33—174)

The present invention relates to a bowling ball grip measuring device and more particularly to such a device which is light in weight, easily portable and particularly adapted for individual use by a person interested in acquiring a bowling ball, so as to enable such a person to make his own measurements at home or elsewhere and transmit them by mail or otherwise to an organization selling bowling balls, who may then use this information to bore the necessary holes in the ball and transmit it to the customer. Such a device is usable, for example, for use by mail order houses who may sell bowling balls and who may wish to obtain reasonably exact measurements from persons who do not have access to large and more complicated and costly bowling ball grip measuring devices such as are available only at sporting goods sales centers in the larger cities for example.

The present device may be transmitted to purchasers and potential purchasers of bowling balls and serves in effect as a "throw-away" item, in that it is adapted for a single use, for example, and is so constructed and arranged as to be of little cost and yet simple and reasonably accurate as to the measurements made thereby, so that an organization selling bowling balls and being given the measurements obtainable by this device may drill the balls and have them reasonably accurately adapted for the personal use by the one ordering the ball and whose measurements have been given.

The present device is intended to measure only the span, i.e. the space between the thumb hole and each of the one or two finger holes in accordance with the desires of the user along the curved surface of the ball as measured from the nearest edge of the thumb hole to each of the one or two finger holes respectively which are to be drilled and used.

It is recognized that there are many devices in prior art of a larger and more complicated nature which are effective to make such measurements in an accurate and acceptable manner. However, such devices are so costly that they are practical for use only where they can be used often and repeatedly as in a sporting goods store, and where the demand for such measurements is sufficient so as to warrant the expense of installing such a device. Perhaps the closest prior art of the larger and more complicated bowling ball grip measuring type which approaches in its general arrangements the devices of the present invention is that shown in the patent to Gillett, No. 2,516,694, issued July 25, 1950. This device is obviously a large, rather heavy, rather complicated device which is adapted for use only in a sporting goods store or the like as aforesaid. It is not and could not satisfactorily be used or adapted for use as a "throw-away" item as the cost thereof is far too great to give one to each customer or potential customer of a bowling ball for a single use at home or elsewhere. Furthermore, the construction differs as will be pointed out as the present description proceeds as to the construction of certain embodiments of the present invention.

It is recognized that the present invention is adapted to measure the span only as above defined and not the diameters for the thumb hole or either finger hole of a bowling ball, as these diameters may be measured in any other suitable way having no relation to the present invention.

Summarizing the present invention, therefore, it comprises a small, light and easily portable device for measuring the thumb-finger span of a bowling ball grip including basically a thumb hole-providing member of flexible material and which is substantially C-shaped in cross-section, so as to provide a substantially cylindrical cavity for the thumb of a user. The open side of the C is provided so that the material may flex to accommodate it to various different-sized thumbs for different potential users. Rigid with this thumb hole-providing means during the use thereof is a means comprising a substantially arcuate wall, an edge portion of which has a radius of curvature corresponding to that of a standard bowling ball, this edge portion serving as a support for a finger of a user which is to be measured when the thumb of the user is projected into the thumb hole-providing means as far as it will go. This substantially arcuate wall lies substantially in a plane which is radial with and includes the radius of curvature of the edge portion aforesaid and which plane is also substantially a prolongation of a diametrical plane of the substantially cylindrical thumb hole provided by the first-named member. Associated with the edge portion, against which a finger to be measured rests during the measurement, are a series of numbered scale markings which may be graduated and marked in any suitable units, so that one using the device reads the span to be measured on the scale opposite the crease of the second joint of the finger in question. From this reading, the exact span may then be ascertained as there is a definite span distance along the surface of a bowling ball corresponding to each reading made as aforesaid and which is known to those who are in the business of boring bowling balls and of using the present device in conjunction therewith.

The present invention will be more readily understood by reference to the accompanying drawings, in which two embodiments of the invention are illustrated, In the drawings:

FIG. 1 is a view substantially in perspective of a device made as an integral body and preferably of a transparent plastic material and embodying the present invention;

FIG. 2 is a side elevation of the device of FIG. 1 showing it in measuring relation to the thumb and the middle finger of a user, when the device is appropriately applied to the hand of the user;

FIG. 3 is a sectional view of the devices of FIGS. 1 and 2 taken substantially on the line 3—3 of FIG. 1;

FIG. 4 is a plan view of another embodiment of the vention, which is made in two parts and those parts properly assembled together; and FIG. 5 is a view in elevation of the device of FIG. 4 shown in conjunction with the hand of a user in the position in which the hand exists when the device is in use for actual measurement.

Considering first the form of the invention of FIGS. 1–3, in this form there is shown an integral device, preferably made of a transparent and somewhat flexible organic plastic material such as clear polystyrene and providing a member or portion 10 which may be considered a thumb hole-providing member. This member is substantially C-shaped in cross-section as shown in FIG. 1, the opening in the C being indicated at 11 and being provided so that the material may be flexed to the extent necessary by a person having a thumb larger than the size which the material assumes in an unstrained condition. In this unstrained condition it provides a substantially cylindrical opening or hole 12 for the thumb of the user, which is shown in FIG. 2 in dotted lines at 13 projecting through the thumb hole-providing member 10 as shown in that figure.

The device also comprises, as shown in FIGS. 1–3, a means which is rigid with the thumb hole-providing means 10 and which comprises in part at least a substantially arcuate wall 14, the upper edge of which terminates in an edge portion having a radius substantially equal to the radius of curvature of a standard bowling ball. This edge portion, as shown in FIGS. 1–3, is reinforced by substantially flange-like members 15 and 16 forming in effect a second curved wall 17 which serves as a support for a finger to be measured such as the finger 18 shown in FIG. 2. It will be noted that the wall 14 lies in a substantially radial plane containing the radius of curvature of the surface of the upper edge portion thereof which conforms to the radius of curvature of a standard size bowling ball. Further, the wall 14 is in effect a prolongation of a diametrical plane of the cylindrical opening providing the thumb hole 12.

The walls 14 or 17 or both are preferably provided with numbered scale markings, the arrangements in FIGS. 1–3 showing a plurality of such markings at 19 in FIG. 1, and with numbers therefor shown on the wall 14 at 20, these numbers as shown being from 15 to 45 in even multiples of 5.

The arrangement is such that when a device as just described is made as presently preferred of a transparent plastic material, the scale markings 19 and the numbers 20 may be used in conjunction with one another. It will be understood that the scale numbers shown in the drawings are arbitrary and for purposes of illustration only and that any desired scale and numbers therefor may be used. In the event the material of which the device is made be opaque, then the numbers would be placed either on the edge of the wall 17 or in any desired place adjacent to the scale markings 19 with possibly the markings on or extending over the edge of the wall 17 and the numbers where they are shown located at 20.

In use, a prospective purchaser of a bowling ball extends his thumb through the thumb hole-providing means 10 as far as it will go as shown in FIG. 2, with a finger to be measured extending along the curved surface provided by the wall 17. A reading is then taken opposite the crease at the second joint of the finger to be measured, which is here shown at 21, so that the reading as seen in FIG. 2 would be about 26.

It is noted that in FIG. 2 the right hand of a user is the hand being measured, which is normal as most persons bowl holding the ball in their right hand. It is contemplated, however, that the device could be used to measure either hand and, therefore, that the scale markings as shown at 20 in FIGS. 1 and 2 could be placed similarly on both sides of the wall 14. It is further contemplated that a bowler may use any desired combination of one or two fingers in conjunction with his thumb in bowling and for this reason the showing in FIG. 2 illustrates the measurement of the middle finger of the right hand and particularly a measurement of the span thereto from the thumb. The span to the ring or third finger of a person's hand may be measured in exactly the same way in the event that the bowler desires to use that finger. Further, if it were to be desired, the span to the index finger could be similarly measured. When measurements as taken by this device are transmitted from the person using it to the organization or individual who is actually to drill the bowling ball in accordance with the measurements made, the fingers which are measured are identified by the one measuring them and a reading made using the scale numbers taken for the position of the crease at the second joint of the finger being measured and then translated in accordance with which finger or fingers is being measured to a dimension which is thereupon used for drilling the bowling ball. Inasmuch as this translation of scale readings to actual dimensions is not pertinent to the present invention, but is a matter which can easily be worked out by individuals or organizations using this device, no further details are given herein with respect to it.

It is contemplated that devices in accordance with FIGS. 1–3 may be made by a conventional plastic molding process in a manner now customary for making such moldings and that as such these devices will be relatively light, easily portable, inexpensive to make and such that they may be distributed as a "throw-away" item for use in conjunction with the sale of a bowling ball for example, by a mail order house engaged in such sales.

Turning now to the form of the invention of FIGS. 4 and 5, there is illustrated a device for the same purpose with the same general overall arrangement and mode of use, but somewhat differently constructed. In these figures a thumb hole-providing means 22 is used, again in a C-shape in cross-section for the same reasons hereinabove set out. The wall-means used in conjunction with the thumb hole-providing means to support and measure the finger and span thereto is formed in this embodiment of the invention as a separate piece. This separate piece is preferably made of a flexible material such as cardboard, which is generally of an arcuate or sector shape and is shown as a member 23. In order to attain desired rigidity, the member 23 may be formed initially of double size and folded upon itself at 24, FIG. 4. A suitable scale may be provided thereon by printing on the cardboard and again is illustrated as scale markings numbered with the numbers 15–45 in even multiples of 5. As shown in FIGS. 4 and 5, the folded edge 24 of the wall portion 23 is grippingly embraced in bifurcations 25 which may be formed integral with the thumb hole-providing means 22. Any suitable means may be employed for holding the folded edge 24 between the bifurcations 25, including adhesive or a wire staple or any other means; or, alternatively, the bifurcations 25 may be sufficiently close together so that the friction thereof on the folded edge 24 may be sufficient to hold these parts together with adequate rigidity for use.

The curved upper edge portion shown at 26 of the member 23 provides a support for a finger being measured as shown in FIG. 5 at a time when the thumb of a user is extended as far as possible into the thumb hole-providing means 22. Here the crease at the second joint of the finger being measured, which is again shown at 21, would read about 24 on the scale provided. Here, one of the intermediate fingers, i.e. either the middle or the ring finger of the hand, is being measured, showing how the device may be used in measuring such an intermediate finger. Again in FIG. 5, it may be assumed from the illustration that the left hand of a user is being measured, showing that the device is capable of use with a left hand as well as with a right. This is due to the fact that the plane of the arcuate wall or here the member 23 is substantially in prolongation of the diametrical plane through the substantially cylindrical thumb hole.

In making the device of FIGS. 4 and 5, the thumb hole-providing means 22 may be formed of plastic material by extrusion, for example, with the extruded part cut off at a desired length, while the rest of the device may be formed from a printed and cut-out cardboard or the like. Alternatively, the folded-over device 24 could be formed from a portion of a sheet of plastic material which could be folded over or of sufficient thickness to serve as a single ply sheet and printed on both sides.

It is believed that the embodiment of the invention shown in FIGS. 1–3 would require a somewhat more complicated mold and hence would require a larger initial investment to manufacture; but if the demand were sufficient, could probably be turned out at a lower cost each per unit than the device of FIGS. 4 and 5. On the other hand, the device of FIGS. 4 and 5 is sufficiently simple so that the tooling up to make it would be relatively inexpensive, although the cost per unit might be somewhat greater than the cost per unit of the FIGS. 1–3 form for a relatively large number. Thus the embodiment of FIGS.

4 and 5 is believed better adapted for relatively small scale production; while that of FIGS. 1–3 is believed more desirable for larger scale production. The use of the two embodiments of the invention is substantially the same as hereinabove set out and the readings in either case could be used interchangeably and in the manner set forth.

While we have attempted to explain the construction and use of the device and some alternatives of such construction as the description has proceeded, other equivalents and alternatives usable in part or in whole in lieu of the presently specifically described embodiments will occur to those skilled in the art from the foregoing disclosure. We do not wish to be limited, therefore, except by the scope of the appended claims, which are to be construed validly as broadly as the state of the art permits.

What is claimed is:

1. A small, light and easily portable bowling ball grip measuring device, adapted for individual use by a person interested in acquiring a bowling ball, and comprising a thumb hole-providing member which is substantially C-shaped in cross-section and which is formed of flexible material so as to accommodate and retain thumbs of different sizes, the C-shaped member extending more than 180° around the thumb hole, means fixedly attached to, and adapted to be rigid with said member in use and comprising at least a part which is disposed as a substantially arcuate wall terminating in an edge portion having a radius of curvature corresponding to that of a bowling ball, said wall being disposed in a substantially radial plane containing said radius of curvature and said radial plane being disposed substantially as an extension of a diametrical plane of the thumb hole provided by said member, and numbered scale markings adjacent to said edge portion; so that when a user has his thumb in said thumb hole as far as possible, the span distance to each finger to be measured may be read by means of said scale markings by the position of the crease at the second joint of each such finger, so as to enable a bowling ball to be drilled for the individual user from the measurements so made.

2. A bowling ball grip measuring device in accordance with claim 1, wherein said thumb hole-providing member is formed of plastic material with the opening of the C of its C-shape remote from said arcuate wall which is rigid with said member in use as aforesaid.

3. A bowling ball grip measuring device in accordance with claim 1, in which said means rigid with said C-shaped thumb hole-providing member and including said arcuate wall is integral with said C-shaped member, so that the entire grip measuring device is formed as a single integral body.

4. A bowling ball grip measuring device in accordance with claim 3, further comprising a substantially cylindrical wall portion extending from one end of said thumb hole providing member and defining the curved edge portion of said arcuate wall member, so as to provide a curved support for a finger to be measured when the thumb of the user is extended as far as possible into said thumb hole-providing member.

5. A bowling ball grip measuring device in accordance with claim 4, in which the entire device is formed as a single integral body of transparent plastic material and in which scale graduations are provided on said substantially cylindrical wall portion which serves as a support for a finger of a user being measured during the use of the device.

6. A bowling ball grip measuring device in accordance with claim 1, in which said part disposed as a substantially arcuate wall is formed as a sheet-like member, which is held rigid with said thumb hole-providing member in use.

7. A bowling grip measuring device in accordance with claim 1, in which said device is formed of a transparent, resilient plastic material.

References Cited by the Examiner
UNITED STATES PATENTS

| 2,088,290 | 7/37 | Collier | 33—174 |
| 2,207,403 | 7/48 | Hinkley | 33—174 |
| 2,516,644 | 7/50 | Gillett | 33—174 |

ISAAC LISANN, *Primary Examiner.*